United States Patent Office 3,340,182
Patented Sept. 5, 1967

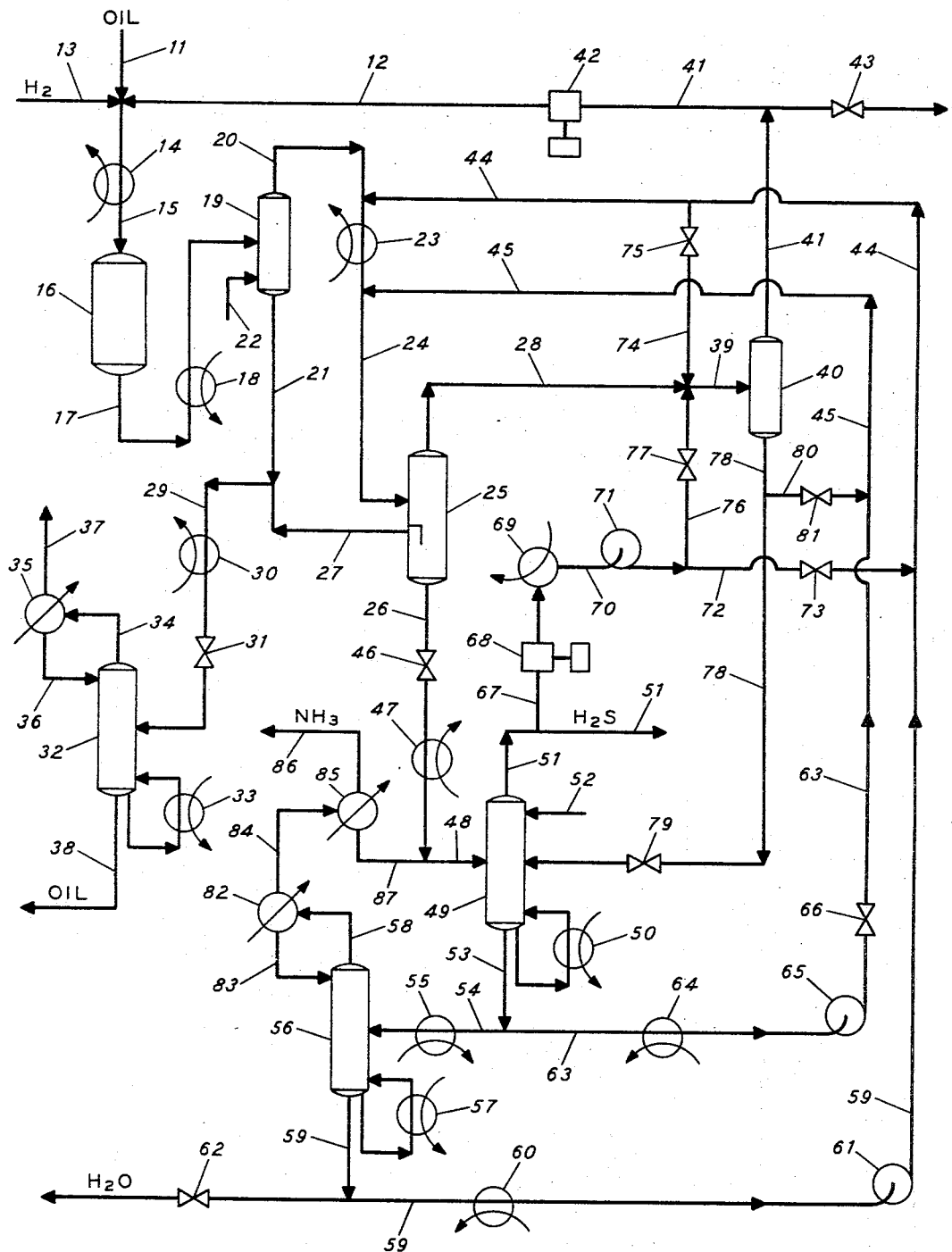

3,340,182
REMOVAL OF H₂S AND NH₃ FROM REACTION
EFFLUENTS
Jay F. Berkman, Palos Verdes Estates, James A. Robbers, Lafayette, and Wayne E. Jones, Torrance, Calif., assignors to Chevron Research Company, a corporation of Delaware
Filed Apr. 1, 1964, Ser. No. 356,502
11 Claims. (Cl. 208—212)

ABSTRACT OF THE DISCLOSURE

Hydrocarbon oil containing nitrogen and sulfur compounds is reacted with hydrogen forming a reaction effluent containing by-product $NH_3$ and $H_2S$. The by-products are removed by scrubbing the effluent with water to which is added another stream containing more of one of the by-products, so that an ammonium bisulfide solution is formed containing essentially all the $NH_3$ and $H_2S$. The ammonium bisulfide solution is treated in a recovery zone to separate the by-products from the water and thus to obtain the added stream used in the scrubbing.

---

This invention relates to processes wherein a hydrocarbon oil containing sulfur compounds and/or nitrogen compounds is contacted with hydrogen at reaction conditions whereby hydrogen reacts with said compounds to form by-products $H_2S$ and/or $NH_3$ and there is obtained a process stream mixture comprising hydrogen, liquid hydrocarbons, and $H_2S$ and/or $NH_3$. More particularly, the invention relates to methods for removing the $H_2S$ formed in the process, and still more particularly the invention relates to methods for removing both $H_2S$ and $NH_3$ by-products.

In many hydrogenative conversion processes applied to hydrocarbon oils, of which catalytic hydrogenation, hydrofining or hydrodesulfurization, and hydrocracking are typical examples, $H_2S$ and $NH_3$ are produced as a result of reaction of hydrogen with sulfur compounds and nitrogen compounds contained in the oil. Sometimes this conversion of one or the other or both of the sulfur and nitrogen compounds is the desired reaction, while in other cases it is merely an incidental reaction. In a typical process normally liquid hydrocarbon oil containing nitrogen compounds and sulfur compounds, and recycle hydrogen-rich gas and makeup hydrogen, are passed through a reaction zone, usually containing a catalyst, at elevated temperature and pressure at which at least a portion of the hydrocarbons are vaporized, and there is obtained as a reaction zone effluent a mixture of vaporized hydrocarbons, hydrogen, $H_2S$, and $NH_3$. The effluent may also contain heavier hydrocarbons which are liquid at the reaction conditions. The reaction effluent is cooled to condense vaporized hydrocarbons, whereby the liquid hydrocarbons can then be separated from hydrogen-rich recycle gas, which is then reused in the process.

It has been common practice to permit the $H_2S$ and/or $NH_3$ to build up in the recycle hydrogen to concentrations such that their partial pressures become high enough that the net production of $H_2S$ and $NH_3$ thereafter will completely dissolve in the liquid hydrocarbons separated from equilibrium with the recycle gas. This reduces the hydrogen partial pressure in the reaction zone unless a correspondingly higher total pressure is used, in which case the costs of building and operating the process are significantly higher. To restrict the concentration build-up of $H_2S$ and $NH_3$ in recycle gas, a portion of the recycle gas may be bled from the system. Then, however, more makeup hydrogen is needed, which may be no less costly than using a high enough pressure so that no bleed is needed.

By means of the present invention $H_2S$ and $NH_3$ can be substantially excluded from the hydrogen-rich gas. The elimination of $H_2S$ greatly reduces the corrosion hazard in the gas recycle system, permitting use of less costly construction materials. The elimination of $NH_3$ is important particularly in catalytic processes for converting nitrogen compounds, as $NH_3$ in the recycle gas inhibits the reaction. The elimination of each increases the hydrogen-rich gas purity, improving the process and/or permitting the use of lower pressure in the process, for example.

When the reaction effluent contains both $H_2S$ and $NH_3$, it has been found that on cooling to temperatures below about 300° F. the $H_2S$ and $NH_3$ may react to form salts which sometimes cause clogging problems in the heat exchangers and the lines. Injection of water into the reaction effluent upstream of the heat exchangers has been used to wash out such deposits and/or to prevent their forming. This water injection can provide a means of removing much of the $NH_3$ formed, if rather large amounts of water are injected sufficient to dissolve the $NH_3$. Rarely will more than an equimolar amount of $H_2S$, with reference to the dissolved $NH_3$, also dissolve in the water. This water cannot readily be disposed of directly where pollution by industrial waste streams is controlled, except by extreme dilution. It is usually passed to an oxidizer with other foul water streams to convert $NH_3$ and $H_2S$ to ammonium thiosulfate, which can be discharged into adjacent fresh waters or bags with less harmful effects on marine life.

In its preferred embodiments this invention greatly reduces or eliminates the problem of disposing of $H_2S$ and $NH_3$-contaminated waste waters. Also, it greatly reduces the water usage in the hydrocarbon conversion process.

In some cases, as where the hydrocarbon oil treated is derived from high nitrogen content materials such as gilsonite, shale oil, or certain crude oils, the reaction effluent will contain more $NH_3$ than $H_2S$. The more common situation is that the $H_2S$ is in substantial excess of the $NH_3$ on a molar basis. This is because most petroleum crudes and fractions derived therefrom inherently happen to contain more sulfur compounds than nitrogen compounds, and also because the sulfur compounds are more readily converted to $H_2S$ than are the nitrogen compounds converted to $NH_3$. Thus, in the usual situation even if water injection is used to remove the $NH_3$, at least a portion of the $H_2S$ is not removed. The portion not removed continually recycles with the recycle hydrogen and builds up in concentration therein until the partial pressure of $H_2S$ is so high that the net amount dissolves in the oil.

In the prior art the oil containing dissolved $H_2S$ is separated, and the $H_2S$ is stripped out or flashed off at a lower pressure, thereby producing a foul gas stream containing the $H_2S$. This gas is then burned, producing noxious $SO_2$, or (more modernly) treated with an absorbing solution for $H_2S$ such as an alkanolamine, i.e., in a Girbitol process. The $H_2S$ so recovered can then be used, for example, to make sulfur or sulfuric acid.

By means of the present invention $H_2S$ can be substantially excluded from the liquid hydrocarbons. Thus the invention can substantially minimize or, in some cases, eliminate the need for a Girbitol unit to treat the vapors released when the liquid hydrocarbons are removed from the high pressure system.

Another advantage of the invention is that it makes possible recovering in very high yield both the $H_2S$ and the $NH_3$ by-products produced in processes of the type described. In the hydrofining and/or hydrocracking of very heavy or highly contaminated oils in large volume the production of $NH_3$ and $H_2S$ may amount to many tons daily. The disposal of these materials in waste waters as heretofore practiced not only presents a pollution hazard, it is wasteful of potentially valuable by-products.

Briefly, in the process of the present invention by-product $H_2S$ and $NH_3$ are removed from a process effluent stream mixture containing hydrogen-rich gas, liquid hydrocarbons, $H_2S$, and $NH_3$ by contacting with water and an added stream containing one of said by-products in greater amounts than the other of said by-products, in relative proportions and amounts such that the $H_2S$ and $NH_3$ are absorbed from the process stream by the water to form a dilute aqueous ammonium bisulfide solution to which the by-products are substantially confined and, thereby, excluded from the contacted liquid hydrocarbons.

The term "ammonium bisulfide solution" is used herein with reference to aqueous solutions containing both $NH_3$ and $H_2S$ in at least equimolar ratio of $NH_3$ to $H_2S$. The solution is described as containing "excess" $NH_3$ if the mol ratio of $NH_3$ to $H_2S$ is above one, rather than attempt to define the ammonium sulfide-bisulfide relationship. The by-products are considered substantially confined to the aqueous phase, and thereby substantially excluded from the oil phase, when not over about 25% of the net production thereof present in the contacted oil-containing mixture is permitted to be dissolved in the oil. The by-product $NH_3$ and $H_2S$ are not necessarily excluded from the gas phase, but their concentrations therein are greatly reduced so that a lesser amount not over about 25%, if any, of the net production of these by-products is removed from the system in hydrogen-rich purge gas.

It is found that the by-products can be substantially confined to the ammonium bisulfide solution if it is relatively dilute, i.e., contains less than about 10 mol percent $H_2S$, and contains between about 1 and 2 mols of $NH_3$ per mol of $H_2S$, depending on the temperature and pressure of contacting. Because the process stream mixture will rarely contain the by-products in the proper proportions, the added stream is used to supply the deficiency either of $NH_3$ or $H_2S$. Also, it is within the contemplation of the invention to use as the water an aqueous solution containing $NH_3$ and $H_2S$ in amounts and proportions not conducive to forming the desired aqueous ammonium bisulfide solution, in which case the added stream is used to adjust the relative amounts of the by-products in the combination of the process effluent stream mixture, water, and added stream. In the invention the so-called added stream is advantageously a recycled portion of a stream obtained by distillation of the aqueous ammonium bisulfide solution.

In accordance with one embodiment of the invention a process stream mixture comprising hydrogen-rich gas, liquid hydrocarbons, $H_2S$, and $NH_3$, containing more $H_2S$ than $NH_3$ on a mol basis, is contacted with an aqueous medium or water and an added stream which is a dilute aqueous solution of $NH_3$ and $H_2S$ containing more $NH_3$ than $H_2S$, at conditions whereby the $H_2S$ and $NH_3$ present in said mixture are absorbed to form an aqueous ammonium bisulfide solution. There is thus formed a three-phase system comprised of purified hydrogen-rich gas, purified liquid hydrocarbons, and aqueous ammonium bisulfide solution. The liquid hydrocarbons are recovered; the hydrogen-rich gas is reused in the process; and the aqueous ammonium bisulfide solution is separated and then passed to a distillation zone wherein it is distilled to remove $H_2S$ and thereby to produce an aqueous solution containing more $NH_3$ than $H_2S$. A portion of this solution is used to form the aforesaid dilute aqueous solution of $NH_3$ and $H_2S$ for contacting the reaction mixture. Thus, there is a continuous cycle of circulation of a portion of the water between a contacting zone and a distillation zone.

The amount of $H_2S$ distilled out of the ammonium bisulfide solution corresponds nearly to the net amount of $H_2S$ absorbed from the process stream mixture. This distillation is to remove only $H_2S$, though an insignificant amount of the $NH_3$ may also be carried off with the $H_2S$.

The excess of $NH_3$ relative to $H_2S$ in the solution obtained by distillation is controlled in the distillation such that the portion thereof which is used in the absorption contacting will pick up the net excess of $H_2S$ over $NH_3$ in the process stream mixture.

The entire amount of solution so obtained by distillation cannot be used in the absorption contacting, if the process stream mixture also contains $NH_3$, because the $NH_3$ concentration would continually build up in solution. Consequently, besides the dilute aqueous solution for contacting the process reaction stream there is used water or another aqueous stream having a lower $NH_3$ concentration. Such a stream may be obtained in accordance with the invention by further distilling the portion of the solution, obtained by distillation of the aqueous ammonium bisulfide solution to remove $H_2S$, which is not used in the contacting, to remove both $NH_3$ and $H_2S$ and thereby obtain water containing substantially less $NH_3$ and $H_2S$, preferably no more than noncontaminating amounts of $NH_3$ and $H_2S$. At least a portion, preferably all, of this water containing substantially less $NH_3$ and $H_2S$ is reused for contacting the process stream mixture with the portion of solution, obtained by distillation of $H_2S$ from the aqueous ammonium bisulfide solution, which was not further distilled.

The extent of distillation of the aqueous ammonium bisulfide solution to remove $H_2S$, and the relative proportion of the solution obtained thereby which is reused as the added stream in the contacting, the other portion being further distilled to remove $NH_3$ and $H_2S$, are controlled to obtain the proper concentrations of $NH_3$ and $H_2S$ and water in the combination of the reaction stream mixture, water, and added stream, so that the $H_2S$ and $NH_3$ are absorbed to form an ammonium bisulfide solution which will not be so concentrated as to exhibit a substantial vapor pressure of either $NH_3$ or $H_2S$. The lower the temperature and the higher the pressure at which contacting between the ammonium bisulfide solution and the oil and gas is accomplished, the higher can be the ammonium bisulfide concentration. Generally, the hydrogen type processes wherein the invention is employed are carried out at pressures above 200 p.s.i.g. and at temperatures above 400° F. If the contacting to form the ammonium bisulfide solution is carried out at temperatures below about 200° F. and pressures above 200 p.s.i.g., the ammonium bisulfide concentration can generally be above 1 mol percent in water. Preferred contacting temperatures are from about 70° F. to about 150° F., and the processes wherein the invention is most valuable are usually carried out at pressures of 500 p.s.i.g. or higher, frequently well above 1000 p.s.i.g. If the pressure is above 500 p.s.i.g., at the preferred low temperatures of contacting or scrubbing, the ammonium bisulfide concentration formed in water may be 2 mol percent or above. Even at pressures above 2000 p.s.i.g., to obtain purified recycle gas and liquid hydrocarbons essentially free of $NH_3$ and $H_2S$, however, the ammonium bisulfide concentration should not exceed 20 mol percent, but it may be, and preferably is, between 2 and 10 mol percent.

In another embodiment of the invention the reaction effluent stream mixture contains more $NH_3$ than $H_2S$, and there is used with the contacting water an added stream which is predominantly $H_2S$. Again, the amounts are controlled to form the desired aqueous ammonium bisulfide solutions by absorbing the $NH_3$ and $H_2S$ produced in the process. In this case the added $H_2S$ is a recycled portion of the $H_2S$ distilled out of the resulting ammonium bisulfide solution, and the water may be obtained by further distillation of the solution as in the previously described embodiment.

Reference is now made to the attached drawing, which illustrates preferred and alternate flow paths and process units as they may appear in the above and certain other embodiments of the invention, for the purpose of explaining in more detail ways in which the process of the invention may be used and carried out. It will be apparent that various other arrangements and techniques, not illustrated, could be devised within the skill of the art based on the disclosure herein of the essential functions to be accomplished.

In the drawing, a hydrocarbonaceous oil such as a heavy gas oil containing sulfur compounds and nitrogen compounds in line 11, and hydrogen-rich gas in line 12 including makeup hydrogen added through line 13, are passed by line 15 containing preheater 14 into reaction zone 16. In reaction zone 16, for example, the oil and hydrogen contact a catalyst such as a sulfactive hydrogenation or hydrofining catalyst at elevated temperature and pressure whereby, in addition to other reactions, the sulfur compounds and nitrogen compounds react with hydrogen to form $H_2S$ and $NH_3$. There is thus obtained in line 17 a reaction zone effluent stream containing hydrogen-rich gas, hydrocarbons, $H_2S$, and $NH_3$, which may be the reaction stream mixture treated in accordance with this invention. In the embodiment illustrated it is contemplated that the oil treated contains high boiling constituents which are liquid even at the high temperatures and high hydrogen partial pressures prevailing in reaction zone 16. Also, oil may be condensed by partial cooling in exchanger 18. It is then advantageous to separate the reaction effluent mixture in separator or stripper 19 into a vapor portion withdrawn through line 20 and a liquid portion withdrawn through line 21. A stripping medium such as hydrogen may be introduced through line 22 to assist in removal overhead of all but the highest boiling liquid hydrocarbons. The material in line 20 is thus a reaction effluent stream mixture containing vaporized hydrocarbons, hydrogen-rich gas, $H_2S$, and $NH_3$. Very little of the $NH_3$ and $H_2S$ will remain dissolved in the liquid oil in line 21 if the temperature in stripper 19 is above about 450° F. at pressures below 3000 p.s.i.g.

The portion of reaction effluent in line 20 containing the by-product $H_2S$ and $NH_3$ is cooled to condense normally liquid hydrocarbons by passing through heat exchanger 23 enroute via line 24 to separator 25, wherein the liquid hydrocarbons can be separated. The liquid hydrocarbons so condensed and separated can be withdrawn from separator 25 through line 27 and passed together with the oil in line 21 through line 29, containing preheater 30 and letdown valve 31, to stripper 32. In stripper 32 light gases which were dissolved in the oil in line 27 are stripped out, by vapors generated in reboiler 33, and taken overhead through line 34. Condenser 35 provides a reflux stream 36 and separates the gaseous materials withdrawn through line 37. The oil recovered in line 38 is thus free of normally gaseous hydrocarbons and by-products $NH_3$ and $H_2S$.

In separator 25 the condensed normally liquid hydrocarbons are separated from hydrogen-rich gas, which latter is withdrawn through line 28. This hydrogen-rich gas may be used as the recycle hydrogen by passing via line 39 to separator 40, then through line 41 and recycle gas compressor 42 to line 12 and the reaction zone inlet.

The above described features of the drawing are typical of prior art installations for hydrotreating hydrocarbon oils. The manner in which this process is carried out is not an essential part of the present invention, but its description is included for the purposes of showing how the operation is altered by means of the invention. Thus, in the prior art, $H_2S$ and $NH_3$ concentrate in the hydrogen-rich gas in lines 28, 41, and 12 until most of the net production of $H_2S$ and $NH_3$ dissolves in the liquid oil withdrawn from separator 25 by line 27. These by-products then reappear as foul gas taken overhead from stripper 32 in line 37. Another portion of the by-products may be removed by opening bleed valve 43 from recycle gas line 41.

In accordance with the invention by-product $H_2S$ and $NH_3$ are removed by contacting the reaction effluent stream containing $H_2S$ and $NH_3$ with water and an added stream containing one of the by-products in greater amount than the other by-product. Thus, in the embodiment illustrated, water is injected by line 44 into the mixture in line 20, and an added stream is injected by line 45 into the mixture in line 20. Separator 25 and line 24 thus act as the contacting zone wherein the process stream mixture containing hydrogen-rich gas, liquid hydrocarbons, $H_2S$ and $NH_3$ is contacted with water and the added stream to thereby extract $NH_3$ and $H_2S$ from the mixture and form a dilute aqueous ammonium bisulfide solution. The aqueous ammonium bisulfide solution so formed is separated from the oil and hydrogen-rich gas in separator 25 and withdrawn through line 26.

The aqueous ammonium bisulfide solution passes through line 26 containing letdown valve 46 and preheater 47, then line 48 to distillation column or stripper 49. In column 49 hot overflowing vapors are generated by reboiler 50 to strip $H_2S$ out of the downflowing aqueous solution. By maintaining a low temperature at the top of the column, there can be obtained overhead in line 51 $H_2S$ vapors of high purity. To aid in cooling and to prevent $NH_3$ carry-over in the overhead, water may be injected through line 52. From the bottom of column 49 there is obtained in line 53 an aqeuous solution of $NH_3$ and $H_2S$ containing substantially more $NH_3$ than $H_2S$. Generally this solution will contain more than 3 mols of $NH_3$ per mol of $H_2S$, more typically 7 or more times as much $NH_3$ as $H_2S$ on a mol basis.

At least a major portion of this aqueous solution passes through line 54 containing cooler 55 to distillation column 56. In this column both $NH_3$ and $H_2S$ are stripped overhead by vapors generated by reboiler 57. The wet overhead vapors in line 58 thus contain most of the $NH_3$ and $H_2S$ entering the column, and the liquid withdrawn from the bottom of the column through line 59 is water containing substantially less $NH_3$ and $H_2S$ than the solution in line 54. At least a major portion of this water passes through line 59, containing cooler 60 and pump 61, and is reused in the contacting zone by passing through line 44. Any net amount of water added, as by line 52, may be withdrawn from line 59 by opening valve 62.

When the reaction stream mixture in line 20 contains more $H_2S$ than $NH_3$, the added stream in line 45 is a portion of the aqueous solution obtained as bottoms from column 49. Thus, a portion is withdrawn from line 53 and passes through line 63 containing cooler 64, pump 65, and valve 56, and then through the portion of line renumbered 45. The relative amounts of material added through line 44 (from line 59) and line 45 (from line 63) are controlled with reference to the composition of the mixture in line 20 so that in separator 25 there is formed an aqueous ammonium bisulfide solution to which the $NH_3$ and $H_2S$ produced in the process and present in the mixture in line 20 are substantially confined and thereby excluded from the liquid hydrocarbons withdrawn through line 27. Thus, very little of the by-products appear in the gas taken overhead from stripper 32 in line 37. Also, the hydrogen-rich gas separated in line 28 can have a very low content of $H_2S$ and $NH_3$ compared to the prior art operation.

When the reaction stream mixture in line 20 contains already much more $NH_3$ than $H_2S$, the added stream is a portion of the $H_2S$ taken overhead from column 49. Thus, a portion of the $H_2S$ rich vapors in line 51 may be diverted through line 67, compressed by compressor 68, and then condensed in condenser 69 to provide liquid $H_2S$ in line 70 which is more readily handled by pump 71 to pass it through line 72 containing valve 73 into renumbered line 44 for contacting the reaction stream mixture.

In one embodiment of the invention it is found advantageous to use both the $NH_3$-rich stream of line 53 and the $H_2S$-rich stream of line 51 in another manner. For example, if the reaction stream mixture contains less $NH_3$ than $H_2S$ and it is particularly desired to exclude $H_2S$ from the liquid hydrocarbons so as to have little or none to remove from the foul gas of line 37, the reaction stream mixture is contacted with water added through line 44 and with an aqueous solution containing more $NH_3$ than $H_2S$ added through lines 63 and 45 so that there is formed an aqueous ammonium bisulfide solution containing an excess of $NH_3$ when the $H_2S$ and $NH_3$ are thereby absorbed from the mixture. This insures that the liquid hydrocarbons separated and withdrawn through line 27, and the hydrogen-rich gas withdrawn through line 28, will have a very low $H_2S$ content. The hydrogen-rich gas, however, will contain more $NH_3$ than it would have contained if less $NH_3$ had been added through line 45, and more than it would have contained if only water were used. The $NH_3$ can then be removed from the hydrogen-rich gas by contacting it with water and an added stream which is predominantly $H_2S$ to thereby absorb the $NH_3$ and form a dilute aqueous ammonium bisulfide solution. That is, a portion of the water in line 44 is diverted through line 74 by opening valve 75, and injected by line 74 into the hydrogen-rich gas in line 39. Similarly, liquid $H_2S$ from pump 71 passes through line 76 when valve 77 is opened, to contact the gas in line 39. The aqueous ammonium bisulfide solution formed is separated in drum 40 and withdrawn therefrom via line 78. The hydrogen-rich gas in line 41 thus may contain some $H_2S$, but the desired objective of excluding the $H_2S$ from the liquid hydrocarbons has been accomplished. The aqueous ammonium bisulfide solution passes through line 78 containing valve 79 to the distillation column or stripper 49, wherein the $H_2S$ is reclaimed and the $NH_3$ rejected out the bottom.

In another mode of operation, all or a portion of the water from line 59 passing through line 44 is diverted through valve 75 in line 74 to first contact the hydrogen-rich gas of line 28 in line 39. A dilute aqueous ammonium bisulfide solution is withdrawn from separator 40 through line 78 and diverted through line 80 by opening valve 81, whence it passes via line 45 to contact the reaction effluent mixture of line 20 in line 24 and separtor 25. A two-stage contacting is thereby accomplished. Ammonia may still be added via line 63 and/or $H_2S$ be added via line 76.

In the drawing there is shown one method for distilling the aqueous ammonium bisulfide solution to obtain an $H_2S$ vapor stream and an aqueous solution containing more $NH_3$ than $H_2S$, and for distilling this aqueous solution to obtain water containing substantially less $NH_3$ and $H_2S$. In the illustrated distillation scheme there is obtained a by-product $NH_3$ of high purity. The details of this distillation form the subject matter of U.S. application Ser. No. 296,323, filed July 17, 1963, by W. M. Bollen, G. H. Goff, and W. L. Short. As disclosed in said application, vapors comprising $NH_3$, $H_2S$, and $H_2O$ taken overhead from column 56 in line 58 are cooled and partially condensed in condenser 82 to provide an $NH_3$ enriched vapor stream in line 84 and a liquid reflux in line 83. The $NH_3$ enriched vapors in line 84 are again partially condensed in condenser 85 to provide high purity $NH_3$ vapors in line 86 and a concentrated solution of $NH_3$ and $H_2S$ in water in line 87. The concentrated solution in line 87 is returned by line 48 to distillation or stripping column 49 for recovery of the $H_2S$. By proceeding in this manner a higher concentration of $NH_3$ is achieved in line 53 than would be obtained if there were no return of a recycle stream through line 87, but the ratio of $NH_3$ to $H_2S$ in the material in line 53 is not necessarily any higher. It is found that to obtain high purity $NH_3$ in line 86 in an efficient manner the stream in line 87 should contain more $NH_3$ than $H_2S$ in a weight ratio of $NH_3$ to $H_2S$ of more than three to one. It is found that there is thereby imposed a minimum weight ratio of $NH_3$ to $H_2S$ of 3 to 1 in the aqueous solution in line 53. As a result, it could become difficult in some instances to achieve the objectives of obtaining in the contact zone comprising separator 25 an ammonium bisulfide solution of the desired concentration by contacting the reaction mixture with the water of line 59 and the solution of line 63. In these instances it may be found advantageous to adjust the composition by also injecting $H_2S$ through line 72.

Typical and preferred operating conditions in the practice of the invention as illustrated in the drawing include temperatures below about 200° F., preferably between 70 and 150° F., during contacting of the reaction effluent stream mixture with water and the added stream to form the aqueous ammonium bisulfide solution. That is, the temperature referred to is the temperature of equilibrium separation of the ammonium bisulfide solution. The pressure during contacting and separation will generally be above 200 p.s.i.g., preferably close to the maximum pressure in the reaction zone wherein the $NH_3$ and $H_2S$ are produced. As mentioned, this may range upwards of 4000 p.s.i.g. In the distillation of the ammonium bisulfide solution to remove $H_2S$ as overhead vapors, there is used superatmospheric pressure, preferably in the range between 20 and 150 p.s.i.g., and rarely above 400 p.s.i.g. The temperature at the top of column 49, for example, is below 100° F. to obtain essentially pure $H_2S$ vapors, and preferably about 60° F. The temperature at the bottom of column 49 is fixed substantially by the pressure employed and the solution concentration, but will usually be between about 210° F. and about 450° F., preferably between about 275° F. and 365° F. Thus, it is advantageous to preheat the solution in line 26 to reduce the load on reboiler 50 for generating upflowing vapors. In column 56 the pressure and the bottom temperature are usually somewhat lower than in column 49, but in the same order of magnitude. Thus, it is frequently desirable to cool stream 54 in exchanger 55, but not so much as to markedly increase the load on reboiler 57 for generating upflowing vapors. The temperature in partial condenser 85 is preferably between about 60° F. and 150° F. to permit cooling with water. The temperature in partial condenser 82 is fixed by pressure and $NH_3$ purity, usually between 190 and 250° F.

The illustrated distillation scheme is preferred for use in conjunction with the present invention because it permits recovering separately and at high purity the by-product $NH_3$ and $H_2S$. This is not essential to the present invention in its broadest aspects, however, because the aqueous solution containing more $NH_3$ than $H_2S$ and the water containing substantially less $NH_3$ and $H_2S$ could be obtained in a distillation scheme where, for example, the overhead vapors of column 56 in line 58 were passed to a process for the conversion of the $NH_3$ and $H_2S$ contained therein to ammonium sulfate.

In the embodiment illustrated in the drawing the contacting of the reaction stream mixture with water and the added stream is shown as being accomplished by injecting the water and added stream into the line containing the reaction mixture and then separating the resulting three phases. It is apparent that more efficient contacting should be obtained by using more elaborate counter-current contacting equipment, but it is found that the simple single-stage contacting illustrated is eminently satisfactory in most instances. Also, in the drawing the hydrocarbon oil and hydrogen are shown passing concurrently through the reaction zone 16. This is not essential to the invention as the oil and hydrogen could, for example, be passed counter-currently. Thus, in such a situation a reaction effluent stream analogous to that in line 20 would be obtained overhead from the reaction zone, and hydrocarbons not vaporized at the reaction conditions would be obtained from the bottom, analogous to line 21. The description of the reaction effluent stream mixture contacted in accordance with the invention as containing liquid hydrocarbons refers to the situation ultimately presented, as the vaporized normally liquid hydrocarbons in stream 20 of the drawing are condensed as liquids by the time they reach separator 25.

The following examples further illustrate the practice of the invention in certain embodiments and the advantages obtained thereby as compared to the practice of the prior art. The first example is illustrative of problems in a prior art process of the type described.

*Example 1*

In accordance with the prior art a crude diesel oil boiling from 550° F. to 670° F., containing 1.6 weight percent sulfur and about 1000 p.p.m. nitrogen, is treated for the primary purpose of removing sulfur. About 2.7 mols of recycled hydrogen-rich gas and about 0.8 mol of makeup hydrogen, per mol of oil, are passed with the oil through a reactor containing a cobalt-molybdenum-alumina hydrofining catalyst at 650° F. and 500 p.s.i.g. The mixture leaving the reactor is cooled and passed to a high pressure separator at 100° F. and 470 p.s.i.g., being contacted enroute with about 4 gallons of added water per 100 gallons of oil. The purpose of the water is to prevent heat exchanger fouling. The resulting water phase in the separator is about a 2 mol percent ammonium bisulfide solution containing essentially the net $NH_3$ produced in the process and about 10% of the net $H_2S$. The liquid hydrocarbon oil phase in the separator contains about 6 mol percent $H_2S$, which is about 63% of the net amount of $H_2S$ produced. The hydrogen-rich gas separated in the separator contains 8.4 mol percent $H_2S$ and 200 p.p.m. $NH_3$. The $H_2S$ content of the hydrogen-rich gas would be much higher were it not that about 12% is bled off, thereby removing the other 27% of the net $H_2S$ production. About 37% of the $H_2S$ dissolved in the oil is flashed off with dissolved light hydrocarbons when the oil is passed to a low pressure separator at 75 p.s.i.g. and 100° F. The remainder of the $H_2S$ is stripped out of the oil in a still at higher temperature and lower pressure. The bleed stream from the hydrogen-rich recycle gas, the low pressure flash gas, and the stripper overhead gas together contain about 18 mol percent $H_2S$, and they must be purified before they can be burned. The foul water from the high pressure separator could not be discharged into the sewer under local regulations unless diluted with a very large amount of fresh water.

The following example illustrates the manner in which the above described operation is improved by use of the present invention.

*Example 2*

In accordance with the invention the reaction effluent mixture, produced by hydrotreating the diesel oil as above, is cooled and passed to the high pressure separator and contacted with slightly less than 20 gallons of water containing about 0.3 mol percent $NH_3$ and about 0.05 mol percent $H_2S$, and with slightly more than 20 gallons of an aqueous $NH_3$ solution containing about 3 mol percent $NH_3$ and about 0.5 mol percent $H_2S$, per 100 gallons of oil. The resulting 2 percent $NH_4HS$ aqueous solution in the high pressure separator contains essentially all the $NH_3$ produced in the process and 95% of the $H_2S$ produced therein. The oil phase contains only 0.3 mol percent $H_2S$, about 3.5 percent of the amount produced. The hydrogen-rich gas contains only 0.4 mol percent $H_2S$ and 200 p.p.m. $NH_3$, if, as before, 12 percent thereof is bled off to remove the other 1.5 percent of the net $H_2S$ produced. The aqueous $NH_4HS$ solution is distilled in two stages, in the manner illustrated in the drawing. The 95% of the net $H_2S$ production is taken overhead from the first column, which is also fed a return stream from the second partial condensation of the second column overhead. About half of the bottoms aqueous solution from the first column is used as the 3 percent $NH_3$ solution, the other half being fed to the second column to obtain as the bottoms therefrom the water containing 0.3% $NH_3$. There is no foul water to dispose of, and the dissolved gases stripped out of the contacted oil require only moderate, if any, purification.

If the distillation of the ammonium bisulfide solution is not to be carried out as just described, the reaction zone effluent can instead be contacted with 36 gallons (per 100 gallons of oil) of a 2% aqueous $NH_3$ solution (which is 90% of the bottoms obtained by distilling the resulting ammonium bisulfide solution to remove $H_2S$), and with 3.5 gallons of a 0.4 percent $NH_3$ solution (obtained as bottoms by distilling the other 10% of the bottoms of the first column), plus 0.5 gallon of makeup water. The overhead of the second column contains water, $H_2S$, and the net $NH_3$ production. It may be used, for example, to produce ammonium sulfate with some of the $H_2S$ overhead from the first column.

The following example illustrates another method of practicing of the invention in recovering $NH_3$ and $H_2S$ from a reaction effluent mixture produced in a process wherein the oil treated contains more nitrogen than sulfur.

*Example 3*

A heavy impure petroleum oil including material boiling above 1000° F., and containing more nitrogen than sulfur on a mol basis, is contacted with hydrogen and a supported nickel-tungsten hydrocracking catalyst at 3000 p.s.i.g. and elevated temperature for the primary purposes of removing nitrogen and lowering the average boiling point of the oil. The reaction zone effluent contains 7000 s.c.f. $H_2$ per barrel of oil and contains hydrogen, 1.1 mol percent $H_2S$, and 0.6 mol percent $NH_3$. This effluent is cooled to 400° F., condensing over 90% of the oil, and the uncondensed vapor is separated from the liquid oil. This vapor contains about 95% of the $H_2S$ and about 95% of the $NH_3$ present in the effluent mixture. To 100 mols of this vapor is added 6.5 mols of an aqueous solution containing 1.1 mol percent $H_2S$ and 1.3 mol percent $NH_3$, and the mixture is then cooled to 150° F. More oil condenses, forming a three phase system comprising (1) a minor liquid oil phase containing 2.5 mol percent $H_2S$ and 0.4 mol percent $NH_3$, (2) a large aqueous phase containing 5 mol percent $H_2S$ and 7.5 mol percent $NH_3$, and (3) a major gas phase containing 0.8 mol percent $H_2S$ and 0.1 mol percent $NH_3$. The phases are separated, and the gas phase is then contacted with water containing 0.01 mol percent $H_2S$ and 0.06 mol percent $NH_3$. In the contacting, $H_2S$ is added by another stream to increase by about 10% the amount of $H_2S$ present. From this contacting there is obtained the aqueous solution previously described as added to the oil and vapor cooled to 150° F. The gas resulting from this contacting still contains 0.8 mol percent $H_2S$ but only 100 p.p.m. (vol.) $NH_3$, and it is returned to the reaction zone with added makeup hydrogen. The aqueous phase containing 5% $H_2S$ and 7.5% $NH_3$ contains 75% of the net $H_2S$ produced in the hydrocracking and close to 95% of the net $NH_3$ produced. The $H_2S$ and $NH_3$ can be recovered separately as essentially pure by-products from this aqueous solution, to obtain the water containing .01% and $H_2S$ and .06% $NH_3$.

In the above example the $H_2S$ added can be added as a gas in a carrier stream of hydrogen. Thus, instead of liquifying $H_2S$ obtained overhead from column 49 as in the drawing, a portion of the $H_2S$ vapor in line 51 can be combined with hydrogen, compressed, and injected into the system where desired.

Practice of the invention as in the preceding example has advantages in oil purifying processes wherein oil and hydrogen are passed countercurrent through a reactor containing a catalyst. In the treatment of heavy oils contaminated with nitrogen compounds it is found that substantially complete nitrogen conversion to $NH_3$ can be accomplished with less catalyst and at milder conditions if the oil and hydrogen are passed countercurrently through a reactor containing a sulfactive hydrogenation catalyst for removing nitrogen compounds, provided the hydrogen is supplied essentially free of $NH_3$. It is not essential that the hydrogen be supplied free of $H_2S$. In fact, it is desirable that the hydrogen supplied for countercurrent contacting of the oil in the catalytic reactor contains $H_2S$, because it is desirable to maintain the catalyst sulfided. The present invention is ideally suited for use in such a situation because by contacting the reaction effluent stream containing the hydrogen-rich gas to be reused with water or an aqueous solution of $NH_3$ and $H_2S$, and with an added excess of $H_2S$, the hydrogen-rich gas can be essentially freed of $NH_3$, though it will contain a desirable small amount of $H_2S$. In such a situation the reaction effluent stream mixture treated in accordance with the invention would be the upflowing vapors withdrawn from the top of the catalytic reaction zone, which vapors contain vaporized hydrocarbons which condense as liquid hydrocarbons at the conditions of contacting used to form the aqueous ammonium bisulfide solution. It will be found desirable to contact the effluent stream mixture with water and an added by-product stream so as to form the aqueous ammonium bisulfide solution, containing essentially the net $H_2S$ and $NH_3$ produced in the process, which is separated from condensed liquid oil and hydrogen-rich gas essentially free of $NH_3$ and $H_2S$. The hydrogen-rich gas will, however, contain a small but significant amount of $NH_3$, whereas it is desirable that the hydrogen-rich gas contain practically no $NH_3$. The hydrogen-rich gas can then again be contacted with water and an added stream of $H_2S$, whereby the hydrogen-rich gas is further purified by removing $NH_3$ to form an ammonium bisulfide solution, and the hydrogen-rich gas is simultaneously desirably enriched in $H_2S$ content. The hydrogen-rich gas can then be used in another process such as a catalytic hydrocracking process employing a catalyst which would be poisoned by ammonia or nitrogen compounds, such process being fed an oil free of nitrogen compounds. The hydrogen from that process can then be used in the oil purifying process.

Thus, it is within the contemplation of the invention that the hydrogen-rich gas may be used in several processes sequentially. Likewise, the oil may be fed to another process. Similarly, it is contemplated that different hydrocarbon oils may be treated in parallel hydrofining processes to remove sulfur and/or nitrogen compounds at reaction conditions appropriate for each oil. The reaction effluent streams in each process may then be contacted with water and an added stream containing one of the by-products in proportions and concentrations particularly adapted to form desired ammonium bisulfide solutions of proper concentration in each case. The several ammonium bisulfide solutions thus formed, which differ widely in amount and concentration, may then be passed to common distillation apparatus for recovery of $H_2S$ and $NH_3$. In such distillations there would be formed vapors composed predominantly of $H_2S$, vapors composed predominantly of $NH_3$, at least one aqueous solution containing more $NH_3$ than $H_2S$, and a water stream containing substantially less $NH_3$ and $H_2S$. Appropriate portions of these respective streams would then be diverted in the proper amounts to the respective different hydrotreating processes to remove the $H_2S$ and/or $NH_3$ from the effluents thereof and thereby form the different ammonium bisulfide solutions.

From the foregoing description it will be apparent to those skilled in the art that various other combinations of treating processes may be improved by incorporating therein the use of the present invention. Accordingly, all such uses as include the practice of the invention defined in the appended claims are intended to be embraced thereby.

We claim:

1. In a process wherein a hydrocarbon oil containing sulfur compounds and nitrogen compounds is contacted with hydrogen at reaction conditions at which hydrogen reacts with said compounds to form by-product $H_2S$ and by-product $NH_3$ and there is obtained a process effluent mixture containing hydrogen-rich gas, liquid hydrocarbons, $H_2S$ and $NH_3$;

wherein said effluent mixture is passed to a contacting zone and therein contacted with water to extract $NH_3$ and $H_2S$ from said mixture and form an aqueous solution containing $NH_3$ and $H_2S$;

the improvement which comprises passing the said aqueous solution to a recovery zone and therein treating it to separate (1) said by-products, from (2) water containing no more than noncontaminating amounts of $H_2S$ and $NH_3$, and to obtain (3) a stream containing one of said by-products in greater amount than the other of said by-products;

passing a portion of said stream, (3), containing one of said by-products in greater amount than the other of said by-products, to said contacting zone as an added stream therein to thereby extract $NH_3$ and $H_2S$ from said process effluent mixture and form a dilute aqueous ammonium bisulfide solution in which the $NH_3$ and $H_2S$ produced in said process and present in said mixture are substantially confined and thereby excluded from the contacted liquid hydrocarbons.

2. Process in accordance with claim 1 wherein said process effluent mixture contains more $H_2S$ than $NH_3$ on a mol basis, and said mixture is contacted in said contacting zone with water and an added stream which is an aqueous ammonia solution containing at least three times as much $NH_3$ as $H_2S$ on a mol basis.

3. Process in accordance with claim 1 wherein said process effluent mixture contains more $NH_3$ than $H_2S$ on a mol basis, and said mixture is contacted in said contacting zone with water and an added stream which is predominantly $H_2S$.

4. In a process wherein a hydrocarbon oil containing sulfur compounds and nitrogen compounds is contacted with hydrogen-rich gas at reaction conditions at which hydrogen reacts with said compounds to form $H_2S$ and $NH_3$ and there is obtained a process stream mixture comprising hydrogen-rich gas, liquid hydrocarbons, $H_2S$, and $NH_3$, containing more $H_2S$ than $NH_3$ on a mol basis; the improvement which comprises contacting said mixture with water and a dilute aqueous solution of $NH_3$ and $H_2S$ containing more $NH_3$ than $H_2S$, in relative proportions such that between one and two mols of $NH_3$ per mol of $H_2S$ are present in the combination of said mixture, said water, and said solution, at conditions whereby $H_2S$ and $NH_3$ present in said mixture are absorbed to form an aqueous ammonium bisulfide solution, separating the resulting aqueous ammonium bisulfide solution from purified hydrogen-rich gas and liquid hydrocarbons, distilling absorbed $H_2S$ from said aqueous ammonium bisulfide solution to obtain thereby an aqueous solution containing more $NH_3$ than $H_2S$, using a portion of said solution to form said dilute aqueous solution of $NH_3$ and $H_2S$ for contacting said mixture, distilling absorbed $NH_3$ from the portion of said solution not so used to obtain thereby water containing substantially less $NH_3$ and $H_2S$, and using at least a portion of said water containing substantially less $NH_3$ and $H_2S$ as said water for contacting said mixture.

5. The process of claim 4 wherein said dilute aqueous solution of $NH_3$ and $H_2S$ contains at least three times more $NH_3$ than $H_2S$ on a weight basis.

6. The process of claim 4 wherein said process stream mixture is contacted with water and said dilute aqueous solution of $NH_3$ and $H_2S$ at a temperature between 100° F. and 150° F. and a pressure above about 500 p.s.i.g.

7. The process of claim 4 wherein the composition and amount of said dilute aqueous solution of $NH_3$ and $H_2S$ and the amount of water used for contacting said mixture are controlled with reference to the $NH_3$ and $H_2S$ content of said mixture such that there is formed an aqueous ammonium bisulfide solution containing between 1 and 10 mol percent ammonium bisulfide.

8. In a process wherein a hydrocarbon oil containing sulfur compounds and nitrogen compounds is contacted with hydrogen-rich gas at reaction conditions at which hydrogen reacts with said compounds to form $H_2S$ and $NH_3$ and there is obtained a process stream mixture comprising hydrogen-rich gas, liquid hydrocarbons, $H_2S$, and $NH_3$, containing more $NH_3$ than $H_2S$ on a mol basis; the improvement which comprises:

contacting said mixture with water and added $H_2S$ in relative proportions such that between one and two mols of $NH_3$ per mol of $H_2S$ are present in the combination of said mixture, said water, and said added $H_2S$, at conditions whereby $H_2S$ and $NH_3$ present in said mixture are absorbed to form an aqueous ammonium bisulfide solution;

separating said resulting aqueous ammonium bisulfide solution from purified hydrogen-rich gas and liquid hydrocarbons;

distilling absorbed $H_2S$ from said aqueous ammonium bisulfide solution to obtain thereby $H_2S$ and an aqueous solution containing more $NH_3$ than $H_2S$;

using a portion of the $H_2S$ so obtained as said added $H_2S$ for contacting said mixture;

distilling absorbed $NH_3$ from at least a portion of the aqueous solution so obtained to obtain thereby water containing substantially less $NH_3$ and $H_2S$;

and using at least a portion of said water containing substantially less $NH_3$ and $H_2S$ as said water for contacting said mixture.

9. In a process wherein a hydrocarbon oil containing sulfur compounds and nitrogen compounds is contacted with hydrogen at reaction conditions at which hydrogen reacts with said compounds to form $H_2S$ and $NH_3$ and there is obtained a process effluent mixture containing hydrogen-rich gas, liquid hydrocarbons, $H_2S$, and $NH_3$, with less mols of $NH_3$ than $H_2S$, the improvement for increasing recycle hydrogen purity which comprises:

passing said mixture to a contacting zone and therein contacting it with water and an added dilute aqueous ammonia solution containing more $NH_3$ than $H_2S$ on a mol basis to thereby extract $NH_3$ and $H_2S$ from said mixture and form a dilute aqueous ammonium bisulfide solution to which the $H_2S$ produced in said process and present in said mixture is substantially confined and thereby excluded from the contacted liquid hydrocarbons, but the contacted hydrogen-rich gas contains more $NH_3$ than it would have contained if contacted with water without said added aqueous ammonia solution;

passing the contacted hydrogen-rich gas to a second contacting zone and therein contacting it with water and added $H_2S$ to thereby extract $NH_3$ from said gas and form a dilute aqueous ammonium bisulfide solution;

passing the resulting dilute aqueous solutions from said contacting zones to a distillation zone and therein distilling said solutions to obtain overhead $H_2S$ vapors and bottoms aqueous ammonia solution containing more $NH_3$ than $H_2S$;

reusing a portion of said bottoms aqueous ammonia as said added solution for contacting said process effluent mixture as aforesaid, and reusing a portion of said overhead $H_2S$ vapors as said added $H_2S$ for contacting said hydrogen-rich gas as aforesaid.

10. The improvement of claim 9 wherein the portion of aqueous ammonia bottoms of said distillation zone not reused in said contacting is further distilled to remove $NH_3$ and $H_2S$ to obtain water containing no more than noncontaminating amounts of $H_2S$ and $NH_3$, and at least a portion of the water so obtained is reused in said contacting zones.

11. In a continuous process which comprises passing a hydrocarbon oil, containing sulfur compounds and nitrogen compounds, and hydrogen in an amount more than sufficient to convert said sulfur compounds and nitrogen compounds to $H_2S$ and $NH_3$ through a reaction zone at conditions of elevated temperature and pressure at which said conversion occurs, whereby there is obtained a reaction zone effluent comprising hydrogen, $H_2S$, $NH_3$, and hydrocarbons at least a portion of which are vaporized at the reaction conditions, cooling at least the portion of said reaction effluent which is vapor and contacting said portion with an aqueous medium at conditions whereby vaporized normally liquid hydrocarbons in said portion of reaction effluent are condensed as liquid hydrocarbons, and $H_2S$ and $NH_3$ present in said portion are absorbed in said aqueous medium to form an aqueous solution containing a portion of the $H_2S$ and $NH_3$ formed in said reaction zone and present in said portion of reaction effluent, withdrawing hydrogen-rich gas from the contacting, withdrawing liquid hydrocarbons from the contacting, and withdrawing the resulting aqueous solution from the contacting;

the improvement which comprises contacting said portion of reaction effluent with an aqueous medium containing $NH_3$ and $H_2S$ in amounts such that in the contacting there is formed an aqueous ammonium bisulfide solution containing substantially the net $H_2S$ and $NH_3$ formed in said reaction zone and present in said portion of reaction effluent, whereby the hydrogen-rich gas withdrawn from the contacting is essentially free of $NH_3$ and $H_2S$ and the liquid hydrocarbons withdrawn from said contacting are essentially free of $NH_3$ and $H_2S$;

passing the resulting ammonium bisulfide solution to a first distillation column and distilling therein to remove (1) absorber $H_2S$, and thereby form (2) a dilute aqueous solution of $NH_3$ and $H_2S$ containing more $NH_3$ than $H_2S$, passing at least a portion of said dilute aqueous solution to a second distillation column and distilling therein to remove (3) absorbed $NH_3$, and thereby form (4) water containing substantially less $NH_3$ than $H_2S$;

and reusing at least all but a minor portion of said water (4), and an added stream comprising a portion of at least one of said $H_2S$ (1), said dilute aqueous solution (2), and said $NH_3$ (3), in the aforesaid aqueous medium for absorbing $H_2S$ and $NH_3$ from said portion of reaction effluent.

References Cited

UNITED STATES PATENTS

| | | | |
|---|---|---|---|
| 343,674 | 6/1886 | Parnell et al. | 23—181 |
| 2,773,003 | 12/1956 | Brown et al. | 23—181 |
| 3,096,156 | 7/1963 | Kaunert et al. | 23—181 |
| 3,228,993 | 1/1966 | Kozlowski et al. | 260—667 |
| 3,260,663 | 7/1966 | Inwood et al. | 208—254 |

DELBERT E. GANTZ, *Primary Examiner.*

S. P. JONES, *Assistant Examiner.*